US010054415B2

(12) United States Patent
Feuerstein et al.

(10) Patent No.: US 10,054,415 B2
(45) Date of Patent: Aug. 21, 2018

(54) TAPE MEASURE

(71) Applicant: MILWAUKEE ELECTRIC TOOL CORPORATION, Brookfield, WI (US)

(72) Inventors: Jacob Feuerstein, Milwaukee, WI (US); Roger D. Neitzell, Palmyra, WI (US); Abhijeet A. Khangar, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 145 days.

(21) Appl. No.: 15/281,977

(22) Filed: Sep. 30, 2016

(65) Prior Publication Data

US 2017/0089682 A1 Mar. 30, 2017

Related U.S. Application Data

(60) Provisional application No. 62/235,367, filed on Sep. 30, 2015.

(51) Int. Cl.
*G01B 3/10* (2006.01)

(52) U.S. Cl.
CPC .... *G01B 3/1041* (2013.01); *G01B 2003/1043* (2013.01)

(58) Field of Classification Search
CPC .............................. G01B 3/1041; G01B 3/1043
USPC ........................... 33/755, 760, 761, 767, 768
See application file for complete search history.

(56) References Cited

U.S. PATENT DOCUMENTS

| 2,904,282 | A | | 9/1959 | Zelnick |
| 3,098,622 | A | | 7/1963 | Bishop et al. |
| 3,744,134 | A | * | 7/1973 | Zima, Jr. .............. G01B 3/1071 |
| | | | | 33/768 |
| 3,889,897 | A | | 6/1975 | Van Zelderen |
| 3,918,657 | A | | 11/1975 | Hawker et al. |
| 4,171,109 | A | | 10/1979 | Roe |
| 4,443,944 | A | | 4/1984 | Beesley |
| 4,446,884 | A | | 5/1984 | Rader |
| 4,595,184 | A | | 6/1986 | Bohm et al. |
| 4,603,481 | A | * | 8/1986 | Cohen .................. G01B 3/1005 |
| | | | | 242/380 |

(Continued)

FOREIGN PATENT DOCUMENTS

| CN | 2038902 | 6/1989 |
| CN | 2090040 | 12/1991 |

(Continued)

*Primary Examiner* — G. Bradley Bennett
(74) *Attorney, Agent, or Firm* — Reinhart Boerner Van Deuren s.c.

(57) ABSTRACT

A tape measure including a housing defining an interior and an exterior, where the housing has an opening. A spool is rotatable within the interior of the housing. A tape is at least partially coiled around the spool and extends through the opening of the housing. The tape is movable between an extended position and a retracted position. A biasing member is disposed within the interior of the housing, and the biasing member biases the tape towards the retracted position. The tape measure further includes a bumper disposed at least partially within the housing and having a channel that receives the tape such that the tape extends through the channel. The bumper is movable relative to the housing and is configured to move in response to movement of the tape.

19 Claims, 11 Drawing Sheets

(56) References Cited

U.S. PATENT DOCUMENTS

| | | | |
|---|---|---|---|
| 4,687,155 A | 8/1987 | Burton | |
| 4,907,756 A | 3/1990 | Bourrat | |
| 4,938,430 A * | 7/1990 | Chapin | G01B 3/1005 242/381.3 |
| 4,998,356 A * | 3/1991 | Chapin | G01B 3/1005 242/381.3 |
| 5,033,202 A | 7/1991 | Chen | |
| 5,176,622 A | 1/1993 | Anderson et al. | |
| 5,210,956 A | 5/1993 | Knispel et al. | |
| 5,295,308 A * | 3/1994 | Stevens | G01B 3/1071 33/42 |
| 5,624,085 A | 4/1997 | Usami | |
| 5,794,878 A | 8/1998 | Carpenter et al. | |
| 6,086,007 A | 7/2000 | Till | |
| 6,167,635 B1 * | 1/2001 | Lin | G01B 3/1005 33/755 |
| 6,497,050 B1 * | 12/2002 | Ricalde | B25H 7/04 33/668 |
| 6,662,463 B2 | 12/2003 | Lee | |
| 6,804,898 B1 * | 10/2004 | Hsu | B43K 8/003 33/668 |
| 6,845,736 B1 | 1/2005 | Anderson | |
| 6,996,915 B2 * | 2/2006 | Ricalde | B25H 7/04 33/27.03 |
| 7,062,862 B2 | 6/2006 | Wheaton | |
| 7,263,785 B2 * | 9/2007 | Sullivan | G01B 3/1061 33/768 |
| 7,344,102 B1 | 3/2008 | Royer et al. | |
| 7,401,416 B2 | 7/2008 | Brooks | |
| 7,559,154 B2 | 7/2009 | Levine et al. | |
| 8,056,849 B2 | 11/2011 | Ng et al. | |
| 8,215,027 B2 | 7/2012 | Kang | |
| 8,429,830 B2 | 4/2013 | Kang | |
| 8,584,373 B2 | 11/2013 | Murray et al. | |
| 8,982,500 B1 | 3/2015 | Cherubini et al. | |
| 9,080,849 B2 | 7/2015 | Steele et al. | |
| D787,347 S * | 5/2017 | Wortelboer | G01B 3/1005 D10/72 |
| 9,874,428 B1 * | 1/2018 | Nelson | G01B 3/1005 |
| 2003/0029955 A1 * | 2/2003 | Hsu | G01B 3/1005 242/380 |
| 2004/0118002 A1 | 6/2004 | Lu | |
| 2008/0263886 A1 | 10/2008 | Kang | |
| 2012/0073155 A1 * | 3/2012 | Mabey | G01B 3/1005 33/770 |
| 2012/0298784 A1 | 11/2012 | Morgan et al. | |
| 2013/0185949 A1 * | 7/2013 | Burch | G01B 3/1061 33/768 |
| 2014/0075772 A1 | 3/2014 | Delneo | |
| 2014/0117136 A2 | 5/2014 | Morgan et al. | |

FOREIGN PATENT DOCUMENTS

| | | |
|---|---|---|
| CN | 2092740 | 1/1992 |
| CN | 2206944 | 9/1995 |
| CN | 2247326 | 2/1997 |
| CN | 1181496 | 5/1998 |
| CN | 2314340 | 4/1999 |
| CN | 2344751 | 10/1999 |
| CN | 2356309 | 12/1999 |
| CN | 2356310 | 12/1999 |
| CN | 2370385 | 3/2000 |
| CN | 2374839 | 4/2000 |
| CN | 2374840 | 4/2000 |
| CN | 2462345 | 11/2001 |
| CN | 2475990 | 2/2002 |
| CN | 2485625 | 4/2002 |
| CN | 2536986 | 2/2003 |
| CN | 1461938 | 12/2003 |
| CN | 2606327 | 3/2004 |
| CN | 1546939 | 11/2004 |
| CN | 1185459 | 1/2005 |
| CN | 2718508 | 8/2005 |
| CN | 2859447 | 1/2007 |
| CN | 2884130 | 3/2007 |
| CN | 101004345 | 7/2007 |
| CN | 200968838 | 10/2007 |
| CN | 200996820 | 12/2007 |
| CN | 201014950 | 1/2008 |
| CN | 201021887 | 2/2008 |
| CN | 101165452 | 4/2008 |
| CN | 101173846 | 5/2008 |
| CN | 201083476 | 7/2008 |
| CN | 201096485 | 8/2008 |
| CN | 101358826 | 2/2009 |
| CN | 101424504 | 5/2009 |
| CN | 100520273 | 7/2009 |
| CN | 201285261 | 8/2009 |
| CN | 101655340 | 2/2010 |
| CN | 101676678 | 3/2010 |
| CN | 201520567 | 7/2010 |
| CN | 201532159 | 7/2010 |
| CN | 201540069 | 8/2010 |
| CN | 201637362 | 11/2010 |
| CN | 102829681 | 12/2012 |
| CN | 102901415 | 1/2013 |
| CN | 102901416 | 1/2013 |
| CN | 202660994 | 1/2013 |
| CN | 203148328 | 8/2013 |
| CN | 203240971 | 10/2013 |
| CN | 203310318 | 11/2013 |
| CN | 103673803 | 3/2014 |
| CN | 203586971 | 5/2014 |
| CN | 203928924 | 11/2014 |
| CN | 203928926 | 11/2014 |
| CN | 203976134 | 12/2014 |
| CN | 204142110 | 2/2015 |
| CN | 204268991 | 4/2015 |
| CN | 105004231 | 10/2015 |
| CN | 105066805 | 11/2015 |
| CN | 105222661 | 1/2016 |
| CN | 204944336 | 1/2016 |
| CN | 204963699 | 1/2016 |
| CN | 105318795 | 2/2016 |
| CN | 205403630 | 7/2016 |
| CN | 205403635 | 7/2016 |
| CN | 105856165 | 8/2016 |
| CN | 205426006 | 8/2016 |
| CN | 205879028 | 1/2017 |
| EP | 2562510 | 2/2013 |
| WO | WO8800776 | 1/1988 |
| WO | WO9316767 | 9/1993 |
| WO | WO9513517 | 5/1995 |
| WO | WO9714541 | 4/1997 |
| WO | WO03010485 | 2/2003 |
| WO | WO03074235 | 9/2003 |
| WO | WO03085353 | 10/2003 |
| WO | WO03096839 | 11/2003 |
| WO | WO04056269 | 7/2004 |
| WO | WO05085747 | 9/2005 |
| WO | WO05108909 | 11/2005 |
| WO | WO07059353 | 5/2007 |
| WO | WO08083416 | 7/2008 |
| WO | WO08141614 | 11/2008 |
| WO | WO08145101 | 12/2008 |
| WO | WO2009110879 | 9/2009 |
| WO | WO11047440 | 4/2011 |
| WO | WO2011072337 | 6/2011 |
| WO | WO2011132948 | 10/2011 |
| WO | WO12082034 | 6/2012 |
| WO | WO12142102 | 10/2012 |
| WO | WO15194841 | 12/2015 |
| WO | WO16148504 | 9/2016 |
| WO | WO16164725 | 10/2016 |

* cited by examiner

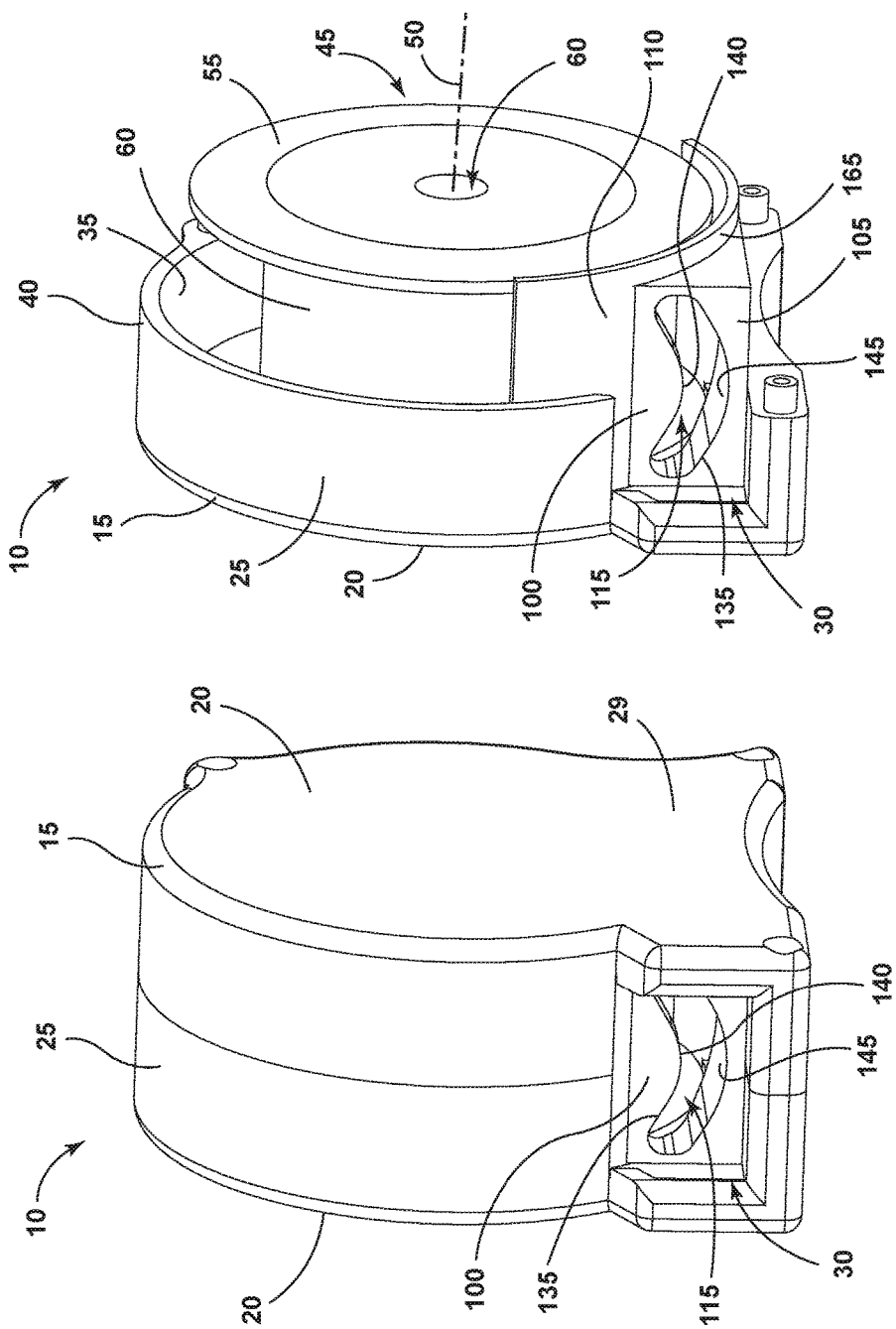

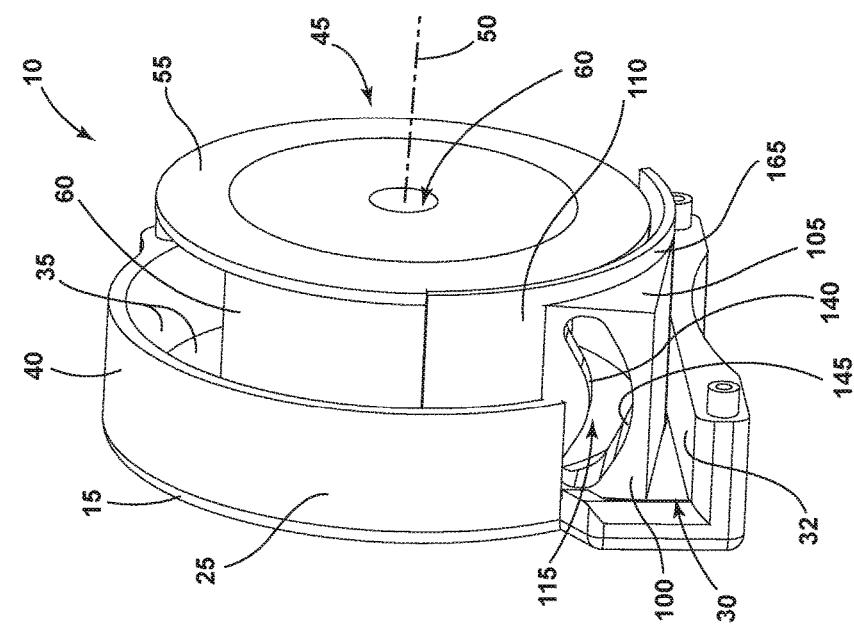
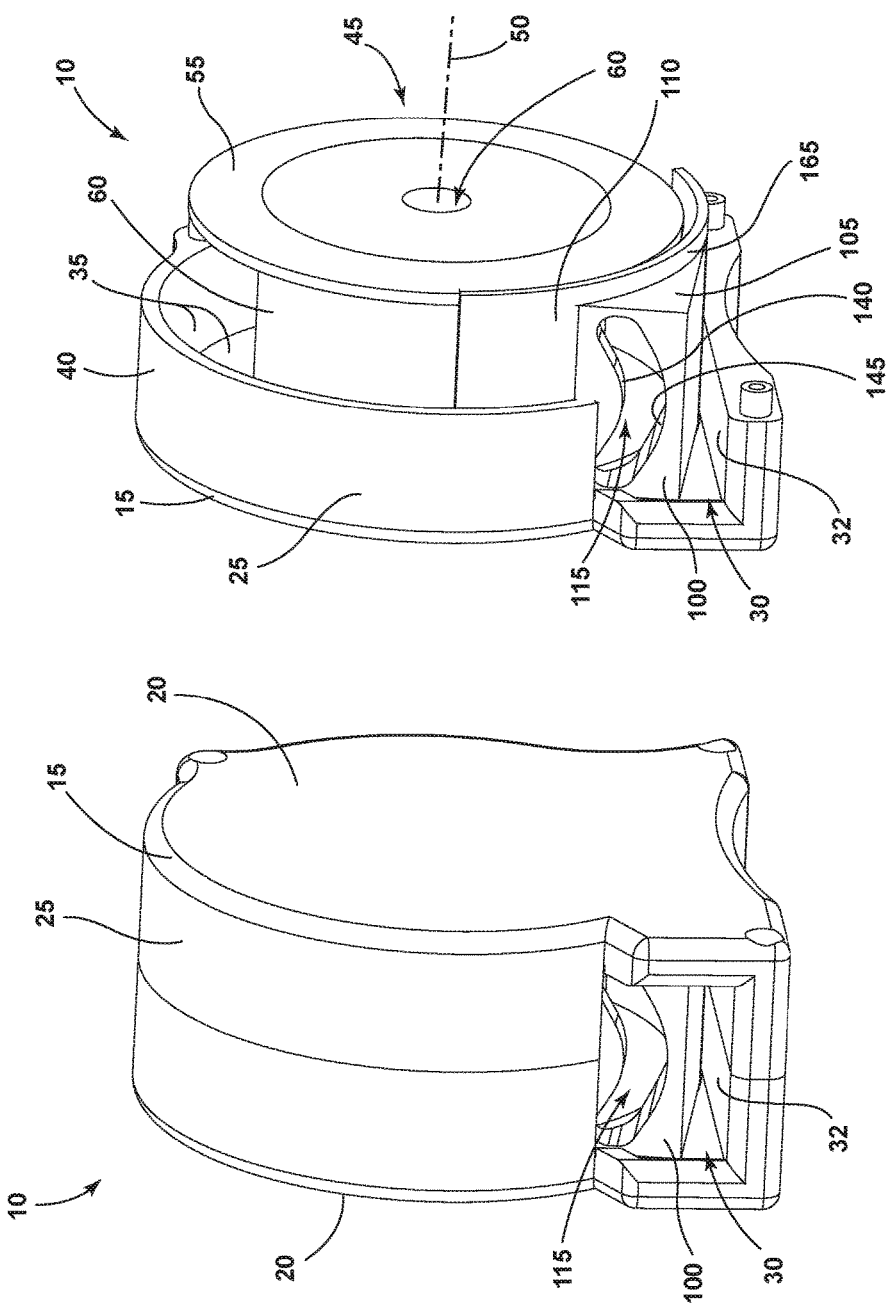
FIG. 3
FIG. 4

TAPE MEASURE

BACKGROUND

The present invention relates to tape measures. More specifically, the present invention relates to tape measures having mechanisms to improve tape retraction and tape control.

SUMMARY

In one construction, an embodiment of the invention provides a tape measure including a housing defining an interior and an exterior, where the housing has an opening. A spool is rotatable within the interior of the housing. A tape is at least partially coiled around the spool and extends through the opening of the housing. The tape is movable between an extended position and a retracted position. A biasing member is disposed within the interior of the housing, and the biasing member biases the tape towards the retracted position. The tape measure further includes a bumper disposed at least partially within the housing and having a channel that receives the tape such that the tape extends through the channel. The bumper is movable relative to the housing and is configured to move in response to movement of the tape.

In another construction, an embodiment of the invention provides a tape measure including a housing defining an interior and an exterior, where the housing has an opening. A spool is rotatable within the interior of the housing. A tape is at least partially coiled around the spool and extends through the opening of the housing. The tape is movable in a first direction between an extended position and a retracted position. A biasing member is disposed within the interior of the housing, and the biasing member biases the tape towards the retracted position. A bumper is disposed proximate the opening of the housing and is engageable with the tape. The bumper is configured to move in a second direction that is different from the first direction in response to movement of the tape.

In yet another construction, an embodiment of the invention provides a bumper for use with a tape measure that includes a housing defining an interior and having an opening, a tape at least partially disposed within the housing and extending through the opening, where the tape is movable between an extended position and a retracted position and is biased towards the retracted position. The bumper includes a guide member having a channel for receiving the tape such that the tape extends through the channel. The guide member is configured to guide the tape through the opening of the housing along a first direction relative to the housing. The bumper further includes a damping member extending from the guide member and defining an engagement element. The engagement element is configured to couple the bumper to the housing while enabling the bumper to move in a second direction relative to the housing, where the second direction is different than the first direction.

Other aspects of the invention will become apparent by consideration of the detailed description and accompanying drawings.

BRIEF DESCRIPTION OF THE DRAWINGS

FIG. 1 is a perspective view of a tape measure including one embodiment of a bumper in a down position.

FIG. 2 is a perspective view of the tape measure of FIG. 1 with a portion of the housing and tape removed and the bumper in the down position.

FIG. 3 is a perspective view of the tape measure of FIG. 1 with the bumper in an up position.

FIG. 4 is a perspective view of the tape measure of FIG. 1 with a portion of the housing and tape removed and the bumper in the up position.

Figure 6:
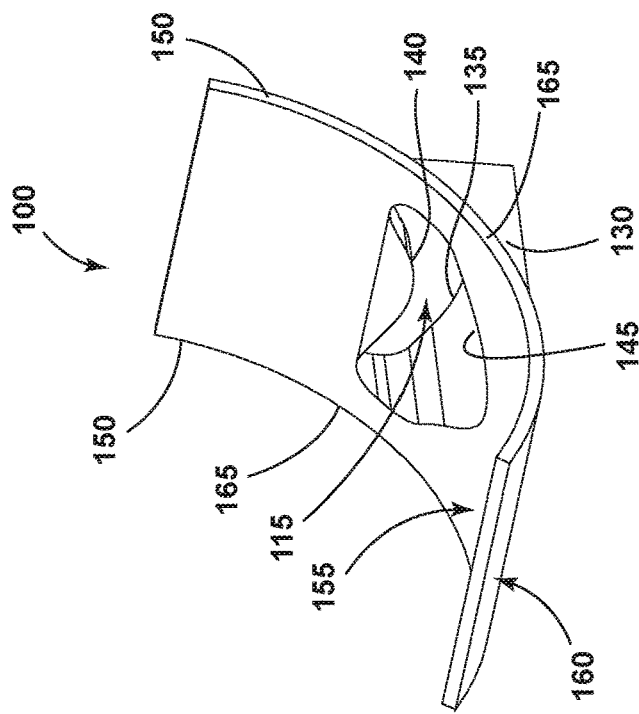
FIG. 6 is a rear perspective view of the tape guide of FIG. 5.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Tape measures typically include a housing, a spool, a spring, and a tape coiled around the spool. The housing substantially encloses the spool, the spring, and the tape. The housing is provided with an opening through which the tape can be extended from the housing. As the tape is extended, the tape is uncoiled from the spool. When the tapes of some tape measures are uncoiled and then released, the tapes tend to accelerate during retraction, and can whip back, potentially causing damage to the tape (e.g., a tear). In particular, when the tape begins to whip the tape can hit the walls defining the opening of the tape measure housing, which can cause the tape to fold over onto itself. When retraction continues after the tape folds over itself, the tape may tear or be otherwise damaged.

FIGS. 1-11 illustrate an embodiment of a tape measure 10 with various parts removed in order to more clearly illustrate and describe the other parts of the tape measure 10. As shown in FIGS. 2 and 4, the tape measure 10 includes a housing 15 that defines an interior space and an exterior space. The housing 15 includes two opposing side walls 20 and a periphery wall 25 connecting the side walls 20. The walls 20, 25 have an internal surface 35 and an external surface 40. The side walls 20 are generally parallel to one another. The peripheral wall 25 forms the perimeter of the housing 15. An opening 30 is defined within the peripheral wall 25 of the housing 15. In the illustrated embodiment, the opening 30 is defined by a bottom surface 32 created by the peripheral wall 25, and the two opposing side walls 20. In the illustrated construction, the housing 15 is formed from two pieces that attach to one another along a seam to form the housing 15. In other embodiments the housing 15 is formed of greater or fewer pieces.

The tape measure 10 includes a spool 45 rotationally supported within the housing 15. The spool 45 defines an axis of rotation 50. In the illustrated embodiment the axis 50 extends between the side walls 20 in a direction substantially perpendicular to the side walls 20 and substantially parallel to the peripheral wall 25. With reference to FIG. 2, the spool 45 includes two circular end walls 55 having an outer diameter with a cylindrical wall 60 connecting the two circular end walls 55. The cylindrical wall 60 has a smaller diameter than the outer diameter of the circular end walls 55 and divides the spool 45 into an inner spool space and an outer spool space. A conduit 65 extends through the center of the spool 45 and is sized to receive a post (not shown) that supports the spool 45 for rotation.

Figure 9:
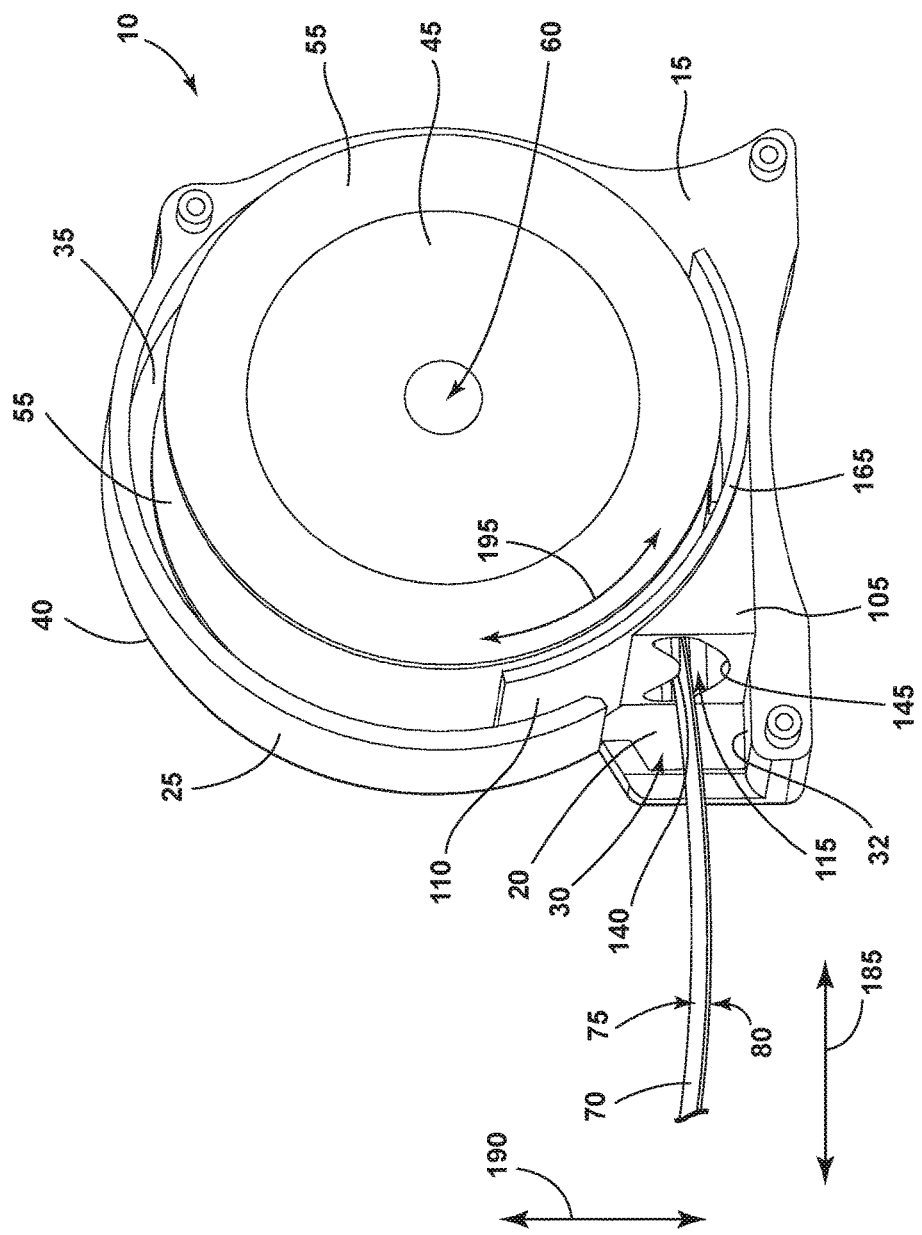
FIG. 9 is a perspective view of the tape measure of FIG. 1 with a portion of the housing removed and the tape engaging with the bumper in the down position.
Figure 10:
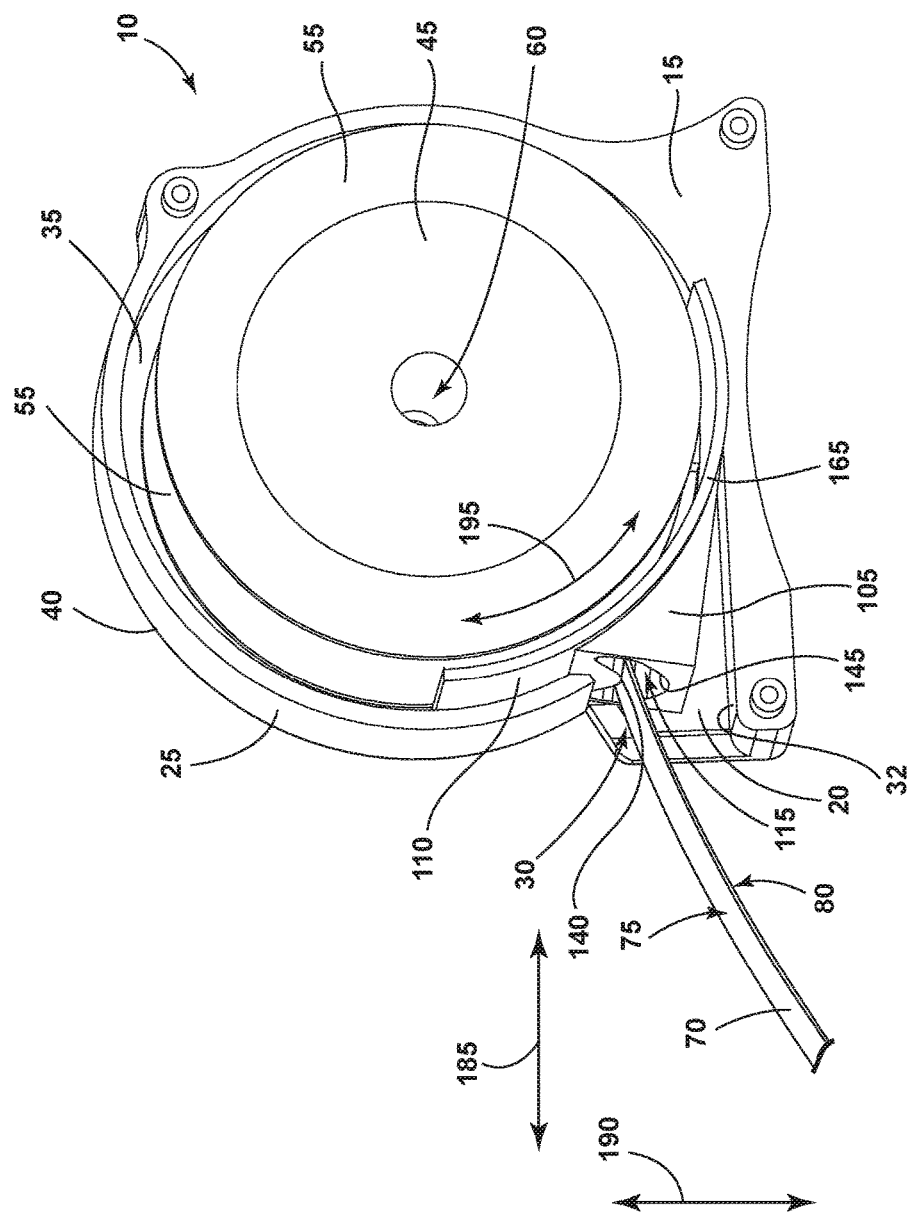
FIG. 10 is a perspective view of the tape measure of FIG. 1 with a portion of the housing removed and the tape engaging with the bumper in the up position.
Figure 11:
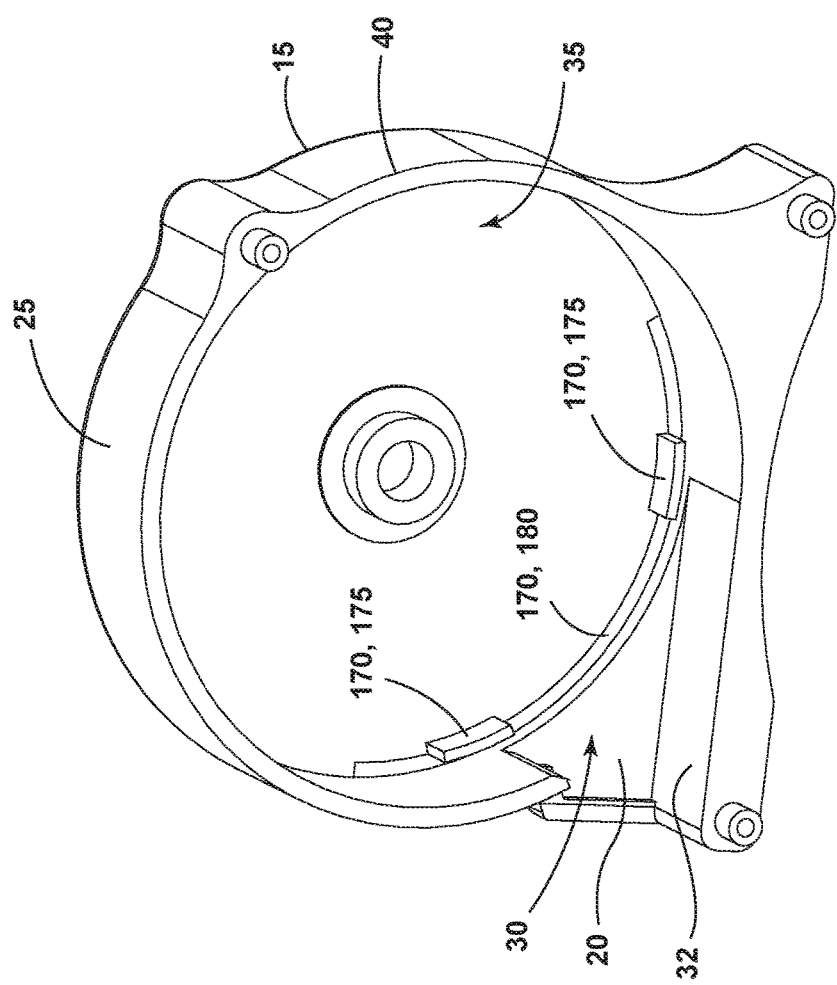
FIG. 11 is a side view of a portion of the housing showing one embodiment of interface surfaces including a flange and a recess.
Figure 12:
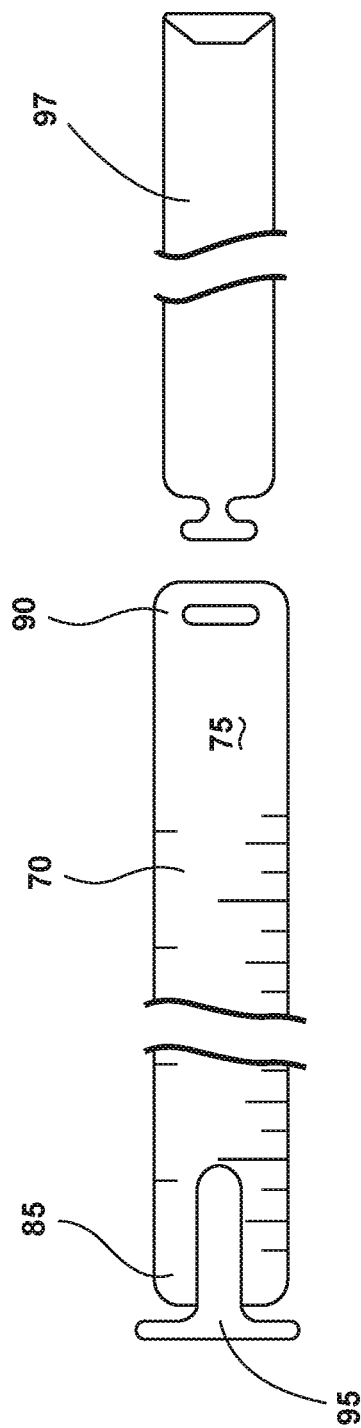
FIG. 12 is a schematic drawing of a tape and a biasing member.

With reference to FIGS. 9, 10, and 12, a tape 70 is at least partially coiled around the spool 45. The tape 70 includes an upper surface 75 and a lower surface 80 that both extend between a first end 85 and a second end 90. The first end 85 extends through the opening 30 of the housing 15. A hook 95 (FIG. 12) is attached to the first end 85 of the tape 70. The hook 95 functions to both inhibit the first end 85 of the tape 70 from being pulled into the housing 15, and to hook 95 surfaces to hold the first end 85 in a desired position for taking a measurement.

The tape 70 can be extended from the housing 15 to measure a length or distance and retracted back into the housing 15 where the tape 70 is coiled around the spool 45. The tape 70 is capable of assuming two different configurations when extended or retracted. In particular, the tape 70 includes an extended portion that is disposed substantially outside of the housing 15, and a retracted portion (not shown) that is coiled around the spool 45. The extended portion of the tape 70 assumes a curved cross sectional shape and is generally linear when viewed along its length. The curved cross sectional shape provides additional stiffness to the tape 70 to allow it to stand-out from the housing 15 without support. The portion of the tape 70 that is retracted within the housing 15 is coiled around the spool 45 and flattens into a substantially planar cross section to provide a more compact shape when wound.

The tape 70 is biased towards the retracted position by a biasing member. In the embodiment shown in FIG. 12, the biasing member is a coiled band 97 that acts as a retraction spring. The coiled band 97 couples the second end 90 of the tape 70 to the post (not shown). The post 55 extends between the two side walls 20 of the housing 15 along the rotational axis 50 (see FIG. 3) of the spool 45. The coiled band 97 biases the tape 70 into the retracted position where the tape 70 is coiled around the spool 45. Once the tape 70 is extended and then released, the coiled band 97 retracts the tape 70 back into the housing 15. In other embodiments, the biasing member may include other types of springs.

The tape measure 10 further includes a bumper 100, sometimes referred to as a tape guide as illustrated in FIGS. 1-10. However, it should be understood that there are many other embodiments of a bumper that are not shown herein.

In the illustrated embodiment, the bumper 100 is disposed within the housing 15 proximate the opening 30. In particular, the bumper 100 is positioned in the internal space defined by the housing 15, between the spool 45 and the opening 30.

Figure 5:
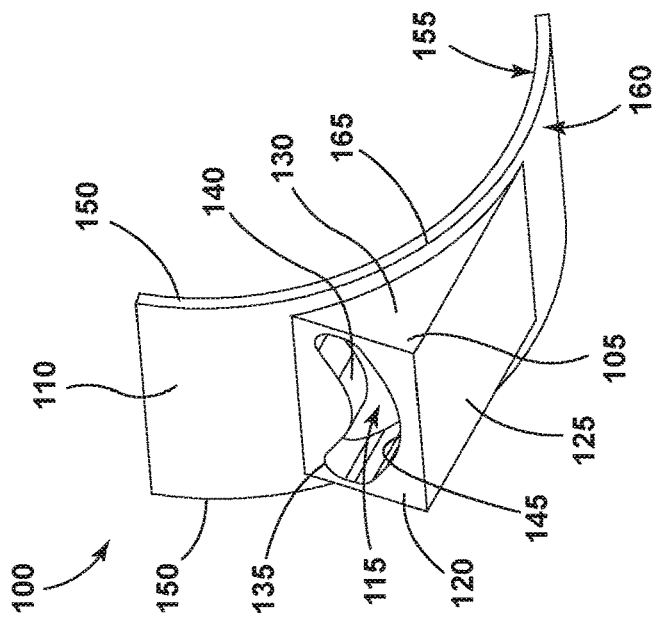
FIG. 5 is a front perspective view of a tape guide suitable for use with a tape measure.

With reference to FIGS. 5 and 6, the bumper 100 includes a first portion (hereinafter "the guide member 105") that guides the tape 70 into the housing 15 and a second portion (hereinafter "the damping member 110") that engages with the housing 15 to control movement of the bumper 100. The guide member 105 includes a channel 115 that guides the tape 70 into and out of the housing 15. The damping member 110 is configured to move relative to the housing 15 to help absorb some of the force created by the tape 70 whipping back and forth as the tape 70 is retracted into the housing 15. As will be explained in greater detail below, this will help reduce wear on the tape 70.

In the illustrated embodiment, the damping member 110 is plate-like and the guide member 105 has a triangular shape that extends from below the damping member 110. In other embodiments, the guide member 105 and the damping member 110 may have different shapes or configurations.

In the embodiment (which embodiment), the guide member 105 includes a front surface 120, a bottom surface 125, and two side surfaces 130. The bottom surface 125 of the guide member 105 faces the bottom surface 32 of the opening 30 of the housing 15. The side surfaces 130 of the guide member 105 each face one of the side walls 20 of the housing 15. The front surface 120 of the guide member 105 faces the opening 30 so that the front surface 120 partially blocks the opening 30. In the illustrated embodiment, a top surface of the guide member 105 is formed by the damping member 110. In other embodiments, the guide member 105 and the damping member 110 are separate pieces.

As shown in FIGS. 9 and 10, the guide member 105 receives the tape 70 within the channel 115 and guides the tape 70 into and out of the housing 15. Thus, the tape 70 extends through both the channel 115 and the opening 30. The illustrated channel 115 extends from the front surface of the guide member 105 through the damping member 110. The channel 115 forms an aperture 135 in the front surface of the guide member 105. The aperture 135 has a first surface 140 that is engagable with the upper surface 75 of the tape 70 and a second surface 145 that is engagable with the lower surface 80 of the tape 70. In the illustrated embodiment, the first surface 140 and the second surface 145 are joined together to form a continuous aperture 135. In other embodiments, the first surface 140 and the second surface 145 are discontinuous. The channel 115 and aperture 135 can be shaped to accommodate any cross section of the tape 70. For example, in the illustrated embodiment, the aperture 135 has a curved shape that accommodates the concave shaped of the tape 70.

Referring back to FIGS. 5 and 6, the illustrated damping member 110 is a curved, or arcuate, plate. The damping member 110 is curved in a first direction along its length. The curve of the damping member 110 corresponds to the curve of the spool 45. The damping member 110 has two edges 150 that are spaced apart to define a width of the damping member 110. The edges 150 of the damping member 110 are substantially parallel to the side walls 20 of the housing 15. In addition, the damping member 110 has an inside surface 155 and an outside surface 160 that both extend between the edges 150 of the plate. The inside surface 155 faces radially inward towards the spool 45. The outside surface 160 faces radially outward towards the peripheral wall 25 and the opening 30 of the tape measure 10.

The guide member 105 extends downward from the outside surface 160 of the damping member 110. The width of the damping member 110 is greater than a width of the guide member 105 such that the edges 150 of damping member 110 extend beyond the side surfaces 130 of the guide member 105. The portions of the damping member 110 extending beyond the side surfaces 130 of the guide member 105 form engagement elements 165.

Figure 7:
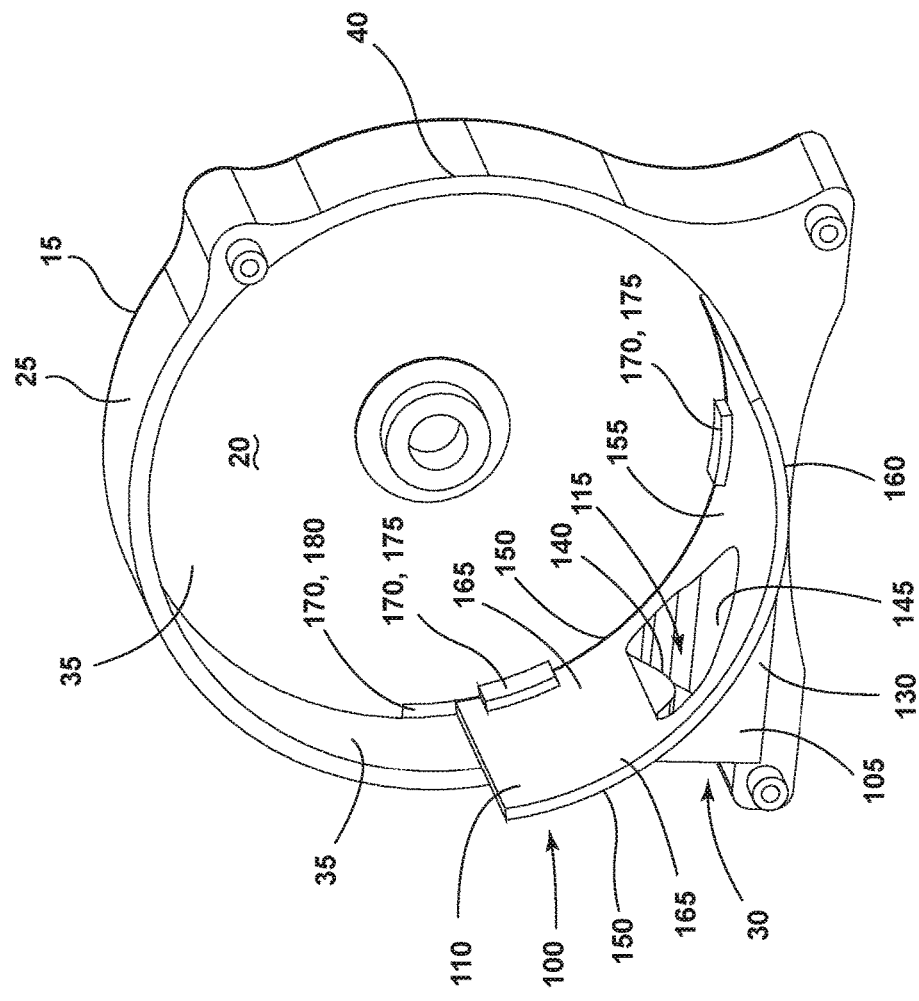
FIG. 7 is a side view of the bumper of FIGS. 5 and 6 engaged with a portion of the tape measure housing, where the bumper is in the down position.
Figure 8:
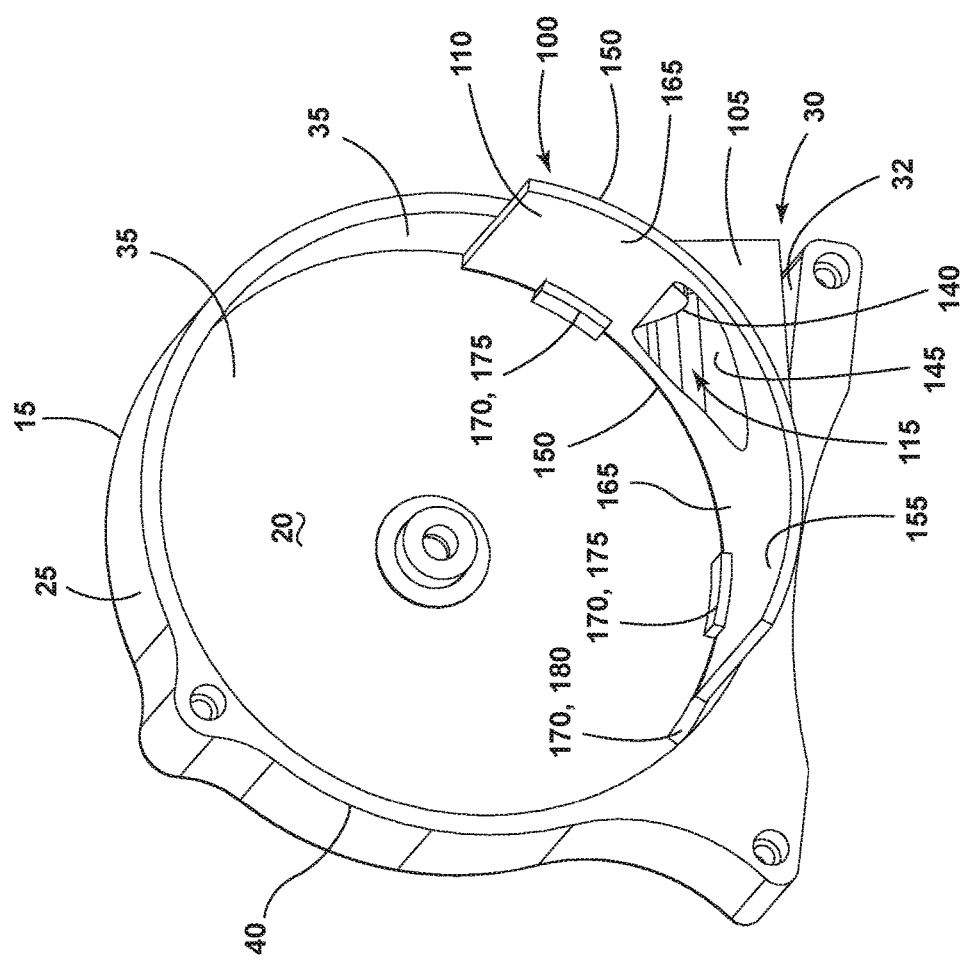
FIG. 8 is a side view of the bumper of FIGS. 5 and 6 engaged with a portion of the tape measure housing, where the bumper is in the up position.

As shown in FIGS. 7 and 8, the engagement elements 165 interact with the housing 15 of the tape measure 10 to control the movement of the bumper 100 relative to the housing 15. Specifically, the engagement elements 165 control the movement of the bumper 100 by engaging with interface surfaces 170 formed on the internal surface 35 of the housing 15. The interface surfaces 170 allow movement of the bumper 100 in some directions and can prevent movement of the bumper 100 in other directions. In addition, the interface surfaces 170 can limit the amount (e.g., the distance or degree) of movement of the bumper 100. In the embodiment illustrated in FIG. 11, the interface surfaces 170 are formed by flanges 175 and recesses 180. In other embodiments, the interface surfaces 170 can be formed by other elements such as rails or cam surfaces.

The bumper 100 is maintained within the housing 15 by flanges 175 that protrude from the side walls 20 of the housing 15. The flanges 175 are positioned radially inward of the engagement elements 165, so that the engagement elements 165 are disposed between the flanges 175 and the peripheral wall 25 of the housing 15. The flanges 175 contact the engagement elements 165 to prohibit the bumper 100 from moving radially inward, toward the spool 45. Although the flanges 175 limit radial movement of the bumper 100, the flanges 175 allow the bumper 100 to move along a path within the housing 15 of the tape measure 10. In the illustrated embodiment, the flanges 175 help guide the bumper 100 to slide back and forth in a circumferential direction within the recesses 180.

The recesses 180 are defined within the side walls 20 of the housing 15. The recesses 180 receive the engagement elements 165 of the damping member 110 to guide the movement of the bumper 100. As the engagement elements 165 slide within the recesses 180, the bumper 100 partially rotates about the axis 50 of the spool 45. The recesses 180 can also limit the degree to which the bumper 100 can slide or rotate. For example, in the illustrated embodiment, the recesses 180 only extend a certain distance along the side walls 20 of the housing 15, thereby limiting the movement of the bumper 100.

As the bumper 100 slides back and forth, the guide member 105 moves relative to the opening 30 of the housing 15. Specifically, the aperture 135 of the channel 115 moves up and down within the opening 30 of the tape measure 10. The bumper 100 can move from a down position, as shown in FIGS. 1, 2, 7, and 9, to an up position, as shown in FIGS. 3, 4, 8, and 10. In the down position, the bottom surface 125 of the guide member 105 is parallel with a bottom surface 32 of the opening 30, and the front surface 120 of the guide member 105 is generally perpendicular to the bottom surface 32 of the opening 30. The aperture 135 of the channel 115 is in a low position relative to the opening 30 of the tape measure 10. When the bumper 100 is in the up position, the guide member 105 rotates upward and the aperture 135 of the channel 115 moves towards a high position relative to the opening 30 of the tape measure 10. The bumper 100 can slide freely between these two positions.

With reference to FIGS. 9 and 10, in operation, the tape 70 is extended and retracted along a first direction 185 (denoted by an arrow), e.g., the retraction direction. As the tape 70 retracts, the tape 70 may whip up and down in a second direction 190 (denoted by an arrow). The movement of the bumper 100 accommodates for movement of the tape 70 in the second direction 190, e.g., movement of the tape 70 in a direction other than the retraction direction 185. Rather than allowing the tape 70 to hit the immobile walls of the opening 30, the tape 70 will be cushioned by the movement of the bumper 100. For example, if the tape 70 begins to whip as the tape 70 is being retracted, the bumper 100 will move with the movement of the tape 70, thereby adjusting the position of the aperture 135 through which the tape 70 is received. As the tape 70 whips in an upward direction, the upper surface 75 of the tape 70 will engage with, and be cushioned by the first surface 140 of the aperture 135. As the tape 70 whips in a downward direction, the lower surface 80 of the tape 70 will engage with, and be cushioned by, the second surface 145 of the aperture 135. Since the bumper 100 is not fixed in place and can absorb some of the movement of the tape 70, the bumper 100 will tend to reduce incidence of the tape 70 folding over on itself during retraction, thereby helping to reduce wear and possible tearing or bending of the tape 70.

The bumper 100 can move in a variety of ways in order to absorb some of the movement of the tape 70. In the illustrated embodiment, the damping member 110 slides circumferentially within recesses 180 of the housing 15 causing the bumper 100 to move in a rotational direction 195 (denoted by an arrow) about the axis 50 of the spool 45. This movement results in the guide member 105, and particularly the aperture 135, moving between the up position and the down position. In other embodiments, the bumper 100 may move in a linear direction rather than a rotational direction 195.

In each of these embodiments, the bumper 100 helps absorb and control the movement of the tape 70. Retraction of the tape 70 can also be controlled by incorporating a braking mechanism 200 (shown in FIGS. 13-15) into the tape measure 10 to slow retraction speed. Although the bumper 100 can be effective without the use of a braking mechanism 200, in some embodiments one or more braking mechanisms 200 can be included in the tape measure 10. Likewise, a braking mechanism 200 can be used without the use of the bumper 100.

Figure 13:
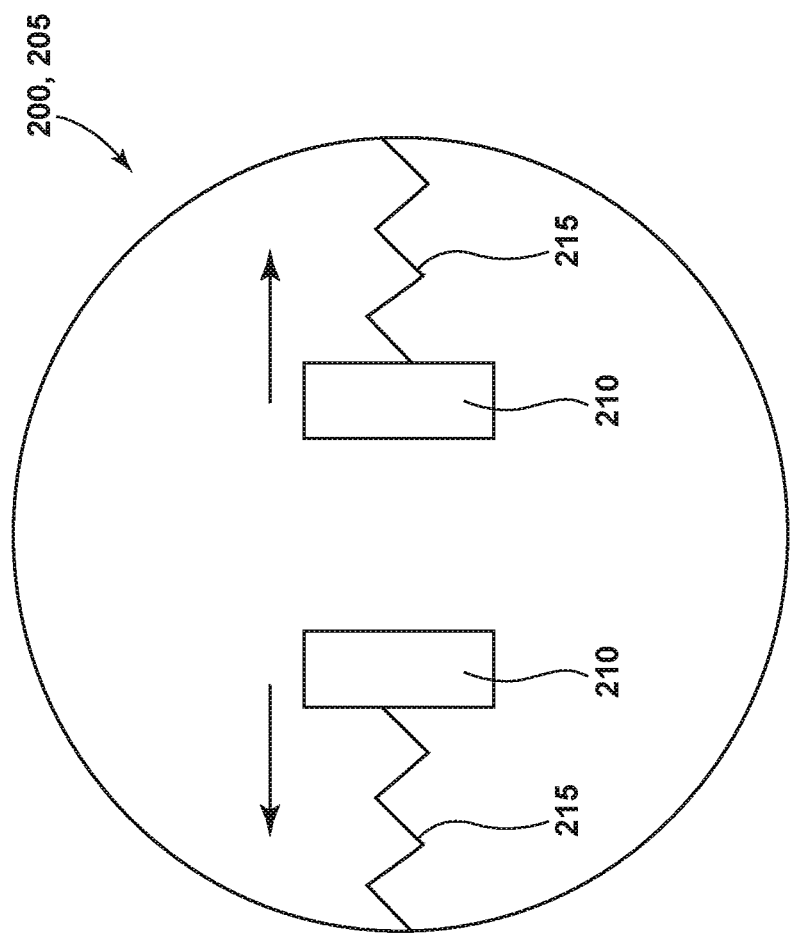
FIG. 13 is one embodiment of a centrifugal damper.

In one embodiment, the braking mechanism 200 includes a centrifugal damper 205 in the tape measure 10. With reference to FIG. 13, the centrifugal damper 205 includes two masses 210 on the spool 45. The masses 210 are movable radially outwardly with respect to the spool 45. In addition, the masses 210 are biased towards one another, and toward the center of the spool 45 by springs 215. When the spool 45 spins and the velocity increases, the centrifugal force on the masses 210 increases. Eventually, the centrifugal force will overcome the spring force and the masses 210 will move away from one another towards the perimeter of the spool 45. As the masses 210 move away from one another, the mass moment of inertia increases proportional to the velocity of the spool 45. When the masses 210 move away from one another against the force of the spring, the masses 210 create a retarding force that counters the acceleration of the tape 70 as it retracts. In some instances, the centrifugal damper 205 can include a single mass 210 or more than two masses 210. In addition, the masses 210 can be arranged to slide radially outward in response to the rotation or can pivot outward about a fixed point. In fact, any movement that moves the center of mass toward the perimeter in response to rotational speed can be used. In one embodiment, the masses 210 are configured not to contact the housing 15 of the tape measure 10 when they are in the radially outer configuration, e.g., the masses 210 do not slow retraction of the tape 70 through frictional braking by contacting the housing 15 of the tape measure 10.

Figure 15:
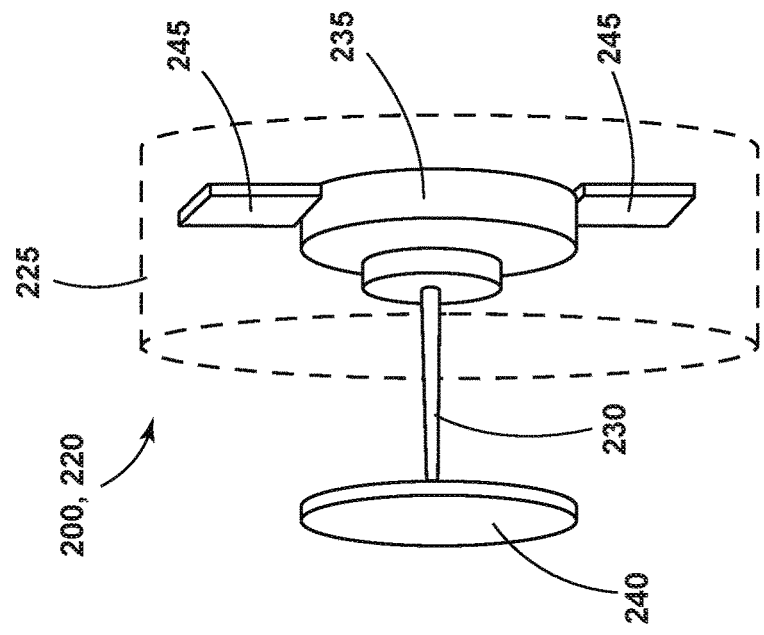
FIG. 15 is another embodiment of a viscous damper.
Figure 14:
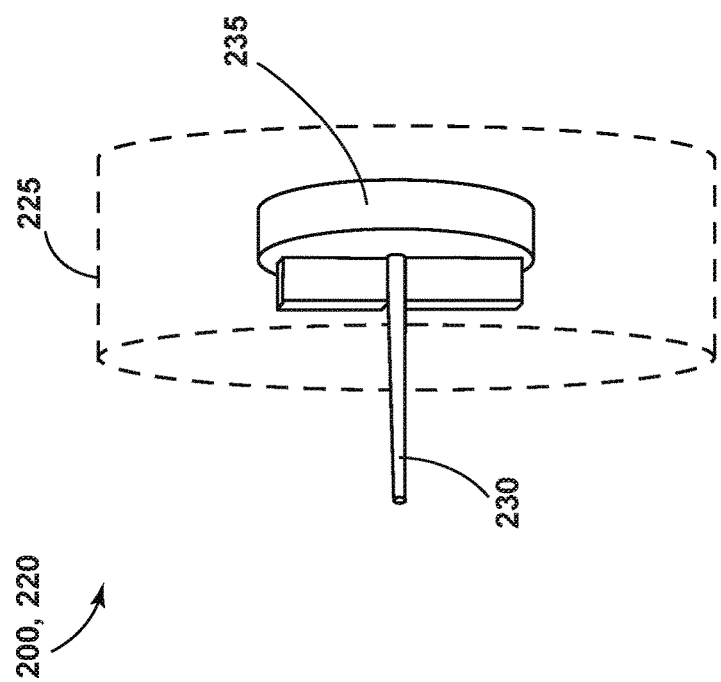
FIG. 14 is one embodiment of a viscous damper.

In another embodiment, the braking mechanism 200 includes a viscous damper 220 which can be included in the tape measure 10. With reference to FIGS. 14 and 15, the viscous damper 220 includes an enclosed compartment 225 containing viscous fluid. The viscous damper 220 further includes an axle 230 having a first end and a second end, where the axle 230 defines an axis. A first disk 235 is positioned on the first end of the axle 230 and a second disk 240 is positioned on the second end of the axle 230. The first disk 235 is enclosed by the compartment 225 and is rotatable within the compartment 225. The second disk 240 is engaged with the spool 45 and rotates with the rotation of the spool 45. The disks 235, 240, are fixed relative to the axle 230 such that rotation of the spool 45 rotates the second disk 240, which, in turn, rotates the axle 230 and the first disk 235 within the compartment 225. In some embodiments, the viscous damper 220 does not include a second disk 240, but rather, the second end 90 of the axle 230 directly engages with the spool 45 or otherwise attaches (e.g., via gears). Two wings 245 extend from the first disk 235 and are enclosed by the compartment 225. The wings 245 are spaced apart from one another and extend radially outward from the first disk 235. In some circumstances, greater or fewer wings 245 can be included. In some cases, the viscous damper 220 does not include wings 245. FIG. 14 illustrates one possible arrangement of the wings 245. In this arrangement, the wings 245 extend from the surface of the first disk 235 and provide a large surface area that must rotate through the fluid. This arrangement produces a large pressure drag to slow the rotation. FIG. 15 illustrates another arrangement in which the wings 245 are arranged to provide a smaller cross sectional area that rotates into the fluid but still a large area that interacts with the fluid during rotation. This arrangement relies more on frictional drag then pressure drag. As one of ordinary skill in the art will realize, many different arrangements of viscous dampers 220 are possible, thereby allowing for precise control of the forces generated in response to rotation.

As the tape 70 retracts, the spool 45 rotates causing the axle 230 and the first disk 235 to rotate. The viscous fluid within the compartment 225 creates a drag force (pressure and/or frictional), which resists the rotation of the first disk 235 and wings 245 within the compartment 225. The drag force slows the rotation of the first disk 235, and thereby slows the rotation of the spool 45 and retraction speed of the tape 70. The wings 245 create additional resistance to the rotational force and further slow the retraction speed of the tape 70. In some constructions, a speed increasing gear arrangement is employed so that the axle 230 rotates at a speed greater than the speed of the tape measure 10 to enhance the damping effect of the damper.

The invention claimed is:

1. A tape measure, comprising:
   a housing defining an interior and an exterior, the housing having an opening;
   a spool rotatable within the interior of the housing;
   a tape at least partially coiled around the spool and extending through the opening of the housing, the tape being movable between an extended position and a retracted position;
   a biasing member disposed within the interior of the housing, the biasing member biasing the tape towards the retracted position; and
   a bumper disposed at least partially within the housing and having a channel that receives the tape such that the tape extends through the channel, the bumper being movable relative to the housing and configured to move in response to movement of the tape.

2. The tape measure of claim 1, wherein the tape extends through the opening in a first direction and wherein the bumper moves in response to movement of the tape in a second direction that is different than the first direction.

3. The tape measure of claim 2, wherein the first direction is a linear direction and the second direction is a rotational direction.

4. The tape measure of claim 1, wherein the bumper includes a damping member defining an engagement element that moveably engages the housing and enables the bumper to move relative to the housing to at least partially absorbs the movement of the tape.

5. The tape measure of claim 4, further comprising an interface surface disposed in the interior of the housing, the interface surface engaging with the engagement element to guide the movement of the bumper, wherein the interface surface includes at least one from the following list: a flange, a recess, a cam surface, and a rail.

6. The tape measure of claim 5, wherein the interface surface prevents the bumper from moving in a radial direction towards the spool and enables the bumper to move in a circumferential direction.

7. The tape measure of claim 4, wherein the damping member is an actuate plate with edges that engage with recesses formed in the housing such that the edges slide within the recesses to move the bumper relative to the housing.

8. The tape measure of claim 1, wherein the channel has a curved cross-section that is concentric to a curved cross-section of the tape.

9. A tape measure, comprising:
   a housing defining an interior and an exterior, the housing having an opening;
   a spool rotatable within the interior of the housing;
   a tape at least partially coiled around the spool and extending through the opening of the housing, the tape being movable in a first direction between an extended position and a retracted position;
   a biasing member disposed within the interior of the housing, the biasing member biasing the tape towards the retracted position; and
   a bumper disposed at least partially within the housing between the opening and the spool, the bumper engagable with the tape and configured to move in a second direction that is different from the first direction in response to movement of the tape.

10. The tape measure of claim 9, wherein the first direction is a linear direction and the second direction is a rotational direction.

11. The tape measure of claim 9, wherein the bumper includes a first surface and a second surface, the first surface engagable with an upper surface of the tape and the second surface engagable with a lower surface of the tape.

12. The tape measure of claim 11, wherein engagement of the upper surface of the tape with the first surface of the bumper moves the bumper towards a first position relative to the opening of the housing, and wherein engagement of the lower surface of the tape with the second surface of the bumper moves the bumper towards a second position relative to the opening of the housing.

13. The tape measure of claim 9, wherein the bumper includes a damping member moveably connecting the bumper to the housing and enabling the bumper to move relative to the housing.

14. The tape measure of claim 13, wherein the damping member defines an engagement element that engages with an interface surface formed within the interior of the housing, the interface surface preventing movement of the bumper in a radial direction towards the spool and enabling movement of the bumper in a circumferential direction.

15. The tape measure of claim 14, wherein the interface surface includes a flange that prevents movement of the bumper in the radial direction and a recess that enables movement of the bumper in the circumferential direction.

16. A tape measure, comprising:

a housing defining an interior and an exterior, the housing having an opening;

a spool rotatable within the interior of the housing;

a tape at least partially coiled around the spool and extending through the opening of the housing, the tape being movable between an extended position and a retracted position;

a biasing member disposed within the interior of the housing, the biasing member biasing the tape towards the retracted position; and a bumper movably coupled to the housing, the bumper including a first surface and a second surface, the first surface engagable with an upper surface of the tape and the second surface engagable with a lower surface of the tape, wherein engagement of the upper surface of the tape with the first surface of the bumper moves the bumper towards a first position relative to the opening of the housing, and wherein engagement of the lower surface of the tape with the second surface of the bumper moves the bumper towards a second position relative to the opening of the housing.

17. The tape measure of claim 16, wherein the first surface and the second surface are formed by a channel extending through the bumper, and wherein the tape extends through the channel.

18. The tape measure of claim 16, wherein the bumper is movably coupled to the housing by a damping member defining an arcuate plate with edges that engage the housing.

19. The tape measure of claim 16, further comprising a flange and a recess disposed on the interior of the housing, the flange configured to prevent the bumper from moving in a radial direction and the recess configured to enable the bumper to move circumferentially within the housing.

* * * * *